US006222532B1

(12) United States Patent
Ceccarelli

(10) Patent No.: US 6,222,532 B1
(45) Date of Patent: *Apr. 24, 2001

(54) METHOD AND DEVICE FOR NAVIGATING THROUGH VIDEO MATTER BY MEANS OF DISPLAYING A PLURALITY OF KEY-FRAMES IN PARALLEL

(75) Inventor: Marco P. Ceccarelli, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,884

(22) Filed: Jan. 29, 1998

(30) Foreign Application Priority Data

Feb. 3, 1997 (EP) .................................. 97200286
Jun. 16, 1997 (EP) .................................. 97201802

(51) Int. Cl.[7] ..................................................... G06F 3/00
(52) U.S. Cl. .......................... 345/328; 345/327; 345/352; 345/357
(58) Field of Search .................................. 345/302, 327, 345/328, 352, 354, 357

(56) References Cited

U.S. PATENT DOCUMENTS

| 5,237,648 | * | 8/1993 | Mill et al. ............................. 345/433 |
| 5,388,197 | * | 2/1995 | Rayner ................................. 345/328 |
| 5,513,306 | * | 4/1996 | Mills et al. ........................... 345/352 |
| 5,521,841 | * | 5/1996 | Arman et al. ......................... 345/328 |
| 5,590,262 | * | 12/1996 | Isadore-Barreca .................... 345/302 |
| 5,606,655 | * | 2/1997 | Arman et al. ......................... 345/440 |
| 5,708,767 | * | 1/1998 | Yeo et al. ............................. 345/440 |
| 5,745,909 | * | 4/1998 | Perlman et al. ...................... 707/513 |
| 5,760,767 | * | 6/1998 | Shore et al. .......................... 345/328 |

OTHER PUBLICATIONS

Journal of Visual Languages and Computing, vol. 1, 1990, Y. Tonomura et al., Content Oriented Visual Interface Using Video Icons for Visual Database Systems:, pp. 183–198.
IEEE Transactions on Consumer Electronics, vol. 41, No. 3, Aug. 1995, H–Y Chen ete al., A multi–layer video browsing system:, p. 842.
IEEE Multimedia, Summer 1994, pp. 62–72, S.W. Smoliar et al: Content–based Video Indexing and Retrieval.
Proceedings of the SPIE, vol. 2417, 1995, H.J. Zhang et al., Content–Based Video Browsing Tools, pp. 389–398.
"Content–Based Video Indexing and Retrieval", by S.W. Smoliar and H.J. Zhang, IEEE Multimedia, Summer 1994, pp. 62–72.

* cited by examiner

Primary Examiner—Raymond J. Bayerl
Assistant Examiner—Cuong T. Thai
(74) Attorney, Agent, or Firm—Gregory L. Thorne

(57) ABSTRACT

A method for navigating through video matter by means of displaying a plurality of key-frames in parallel, whilst allowing selective accessing of displayed keyframes for thereupon controlling actual access to said video matter as representing a mapping of so accessed keyframes, said method being characterized by allowing within a single user interface organization to select between a first operative mode for arranging keyframes in a temporally ordered manner on the screen and a second operative mode for arranging keyframes with multiple selectible granularities between contiguous keyframes as displayed.

14 Claims, 4 Drawing Sheets

METHOD AND DEVICE FOR NAVIGATING THROUGH VIDEO MATTER BY MEANS OF DISPLAYING A PLURALITY OF KEY-FRAMES IN PARALLEL

BACKGROUND OF THE INVENTION

The invention relates to a method according to the preamble of claim 1. The usage of keyframes as representative parts of a video presentation, that is recorded for subsequent selective playback, has been proposed elsewhere. A continuous video stream means that video remains "on", which may include animation, a series of stills, or an interactive sequence of images. The character may be various, such as film, news, or for example a shopping list. State of the art is represented by the article 'Content-Based Video Indexing and Retrieval' by S. W. Smoliar and H. J. Zhang, IEEE Multimedia, Summer 1994, pages 62–72.

Keyframes may be derived from video material upon its reception at the user's through a derivation algorithm, or keyframes may be labelled as such by a video provider, for example, in that each video shot will start with a keyframe. A third scheme is that the frames succeed each other with uniform time intervals as relating to standard video speed. The present invention recognizes that keyframes should be utilized so as to give users a dynamic overview over the presentation, combined with useful facilities for enabling them to easier access the material, for selecting or deselecting for subsequent display, or for editing.

A particular problem with present-day projects for digital and compressed coding of video images is that storage thereof on mass media generally does not allow immediate access thereto, in particular in that the linear storage density such as expressable in frames per storage size is non-uniform. It has been proposed to supplement a high-capacity main storage medium such as tape with a secondary storage medium with smaller capacity and enhanced accessibility. In that case, the execution of trick modes, such as fast forward and fast reverse, as well as editing of the video material for subsequent presentation in an abstracted, modified, or rearranged form give rise to appreciable difficulties, both as seen from the aspect of the user interface, as well as perceived from the aspect of storage technology.

SUMMARY TO THE INVENTION

In consequence, amongst other things, it is an object of the present invention to introduce more flexibility into the organization, as well as to present to a user with a more natural feeling of the storage organization as well as of the video material proper, whilst obviating the need to continually access the main storage medium. Now therefore, according to one of its aspects the invention is characterized according to the remainder of claim 1. Presenting the frames in a temporally ordered manner allows to effect fast forward and fast reverse in a simple manner, for example if the frames succeed each other with uniform time intervals as relating to standard video speed. Furthermore, the easy change of hierarchical level with variable granularity in time between the frames, allows easy accessing and editing. The same is true if the keyframes or at least a fraction thereof derive from filmshot commencements, or from other relevant events generated by the original film editor. In this manner, a clustering operation may be effected automatically.

Advantageously, the method may include highlighting a presently selected keyframe by enlarging it at a multiple-sized format with respect to other keyframes, whilst furthermore including detecting deleterious video interlacing effects and if so, reducing such effect by vertical decimation and/or including applying an upsampling filter to the image before display. Whereas video distortions in relatively smallish keyframes have been experienced as tolerable, if a particular keyframe is enlarged, extra measures should be taken for picture improvement. The inventor has recognized that this upgrading, although not always attaining the quality level present under standard rendering conditions, gives a pleasant and instructive improvement of picture quality.

The invention also relates to a device arranged for implementing the steps of the method as recited. Further advantageous aspects of the invention are recited in dependent claims.

BRIEF DESCRIPTION OF THE DRAWING

These and other aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Various advantages, in particular, but not exclusively pertaining to an ordinary customer and private home use, imply the following:

The keyframes must be presented in such a manner that they are distinguishable from each other by a user person located at a typical TV viewing distance.

The number of keyframes presented simultaneously should be sufficient for providing a user person with an overview of a significant part of the contents of the digital video material.

The keyframes should be displayed in an undistorted fashion such as by retaining aspect ratio.

Preferably, the remote control device of the TV set itself operates as user control device.

Feedback information should be perceivable from a typical viewing distance.

Computer concepts such as "drag and drop" are generally not necessary.

It must be feasible that the facilities be used only occasionally, rather than continually.

The user interface should reflect the familiar linear model of a video presentation.

Disclosure of a Particular Embodiment

Figure 1:
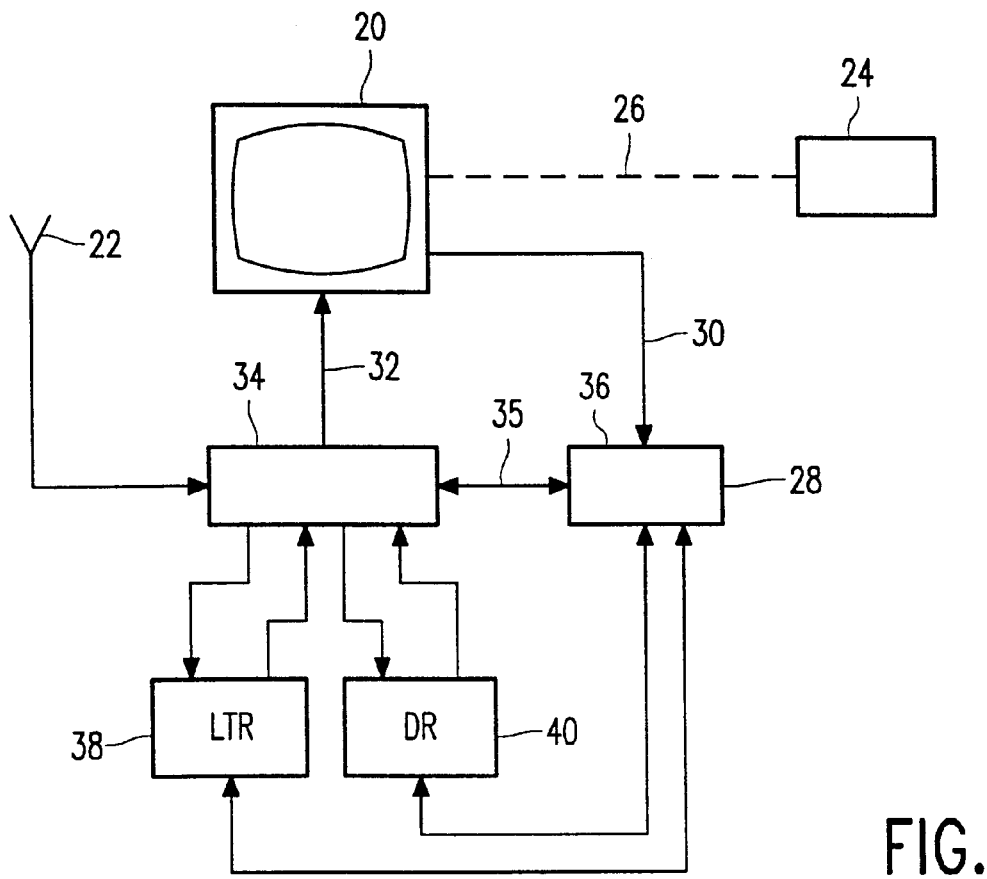
FIG. 1, a block diagram of a TV-Recorder combination.

FIG. 1 is a diagram showing a TV-Recorder combination according to the invention. Item 20 represents the TV-set display and associated immediate control and powering. Item 22 represents an antenna, or a connection with another type of signal distribution entity, such as cable distribution. This item includes, if appropriate, also the derivation of the digital video information or the digital signal part from the received signal. Item 34 represents the routing of the video streams and associated information between the various subsystems of FIG. 1. The routing is governed by control box 28 through control signals on line 35. The latter has been drawn as a single bidirectional interconnection but may in fact be built from any number of unidirectional or bidirectional lines. The control box receives detection signals from display 20 on line 30 and from further subsystems 38, 40, whilst also controlling the latter two. Block 38 is a linear tape recorder with a very high storage capacity in the multi-gigabyte region. Block 40 is a magnetic disc recorder with a high storage capacity, but which is nevertheless only a fraction of that of recorder 38; on the other hand, access in recorder 40 is much faster through cross-track jumping. Together, blocks 38 and 40 form a two-level storage organization that is somewhat akin to a computer memory cache system, and stores all items of a video presentation at least once. Item 24 represents a remote control device that by way of wireless 26 communicates with display device 20, and indirectly with subsystem 28 and further subsystems 38 and 40.

Figure 2:
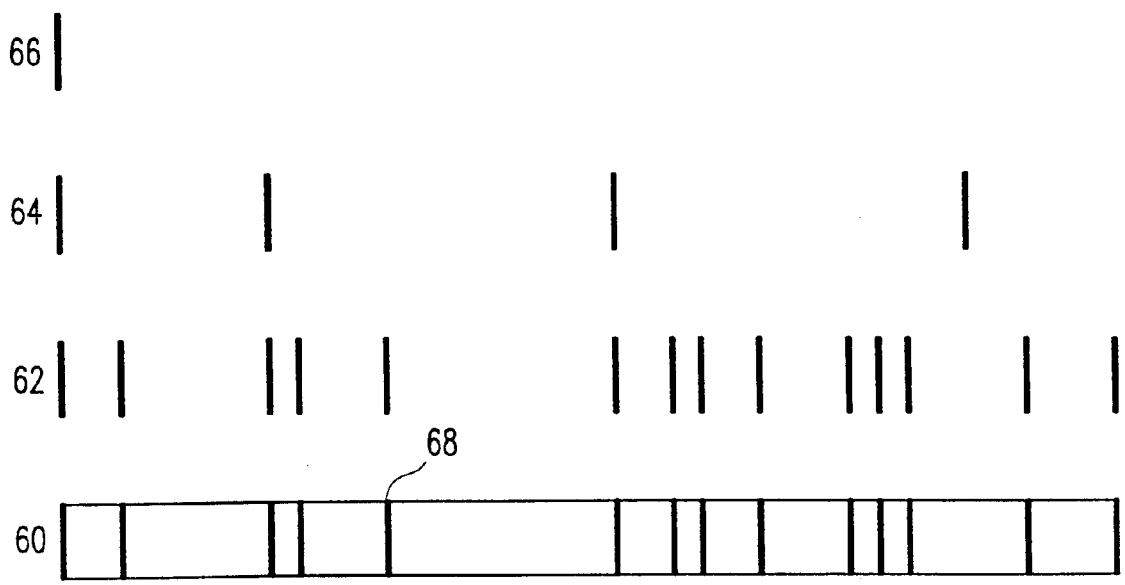
FIG. 2, an exemplary structure of a video recording.

FIG. 2 shows an exemplary structure of a video presentation. For effecting the video matter functionality, bar 60 contains the video itself, either in the form of frames, or as a string of compressed video matter, such as MPEG-coded. The information is stored along the bar as video time progresses, although actual storage requirements need not be uniform over replay time. Interspersed keyframes have been indicated by dark vertical stripes such as 68. A keyframe is used as representing, or as being typical of the overall video in the interval up to the next keyframe. The keyframes may be singled out by a video provider as the first frame of each new shot through adding a label or inclusion in a "table of contents" (TOC). Alternatively, the receiver, through some algorithm, detects that the video content changes abruptly from one frame to the next. The present invention takes the associated algorithms for granted. As shown, their distribution may be non-uniform. A further mechanism is that successive keyframes succeed each other at prescribed intervals, such as every 2–3 seconds. In the embodiment, at indication 62 only the keyframes are represented. Furthermore, the keyframes are organized in some hierarchy, in that indication 64 has only a limited set of highly relevant keyframes. This hierarchization may be multi-level, in that indication 66 is associated with only a single keyframe for all of the video presentation 60. The various levels of keyframes may be determined in different ones of the organizations recited supra, and may even exist side by side.

The storage mapping on FIG. 1 may be effected in that the main body of the video presentation is stored in tape recorder 38, whereas at least the keyframes are reproduced in disc recorder 40, possibly together with short video and/or audio intervals immediately following the associated keyframe. The length of such interval may correspond to the time latency of linear tape recorder 38, so that thereby real-time access may be attained. By itself, the video presentation may be essentially linear, such as a film. Alternative usage is that certain storage intervals may contain animation, stills, or other images to be used by a consumer present. A possible influencing of a keyframe is to suppress it. This effectively joins the time interval before the keyframe in question with the time interval behind it. A reset feature may again disjoin the interval. Also, various classes of keyframes may be suppressed, such as the class that is separated from each other by a fixed time interval. Various different classes of keyframes could be available for one presentation, such as those introduced by the provider versus those that are generated by a local algorithm at reception.

Figures 3, 4:
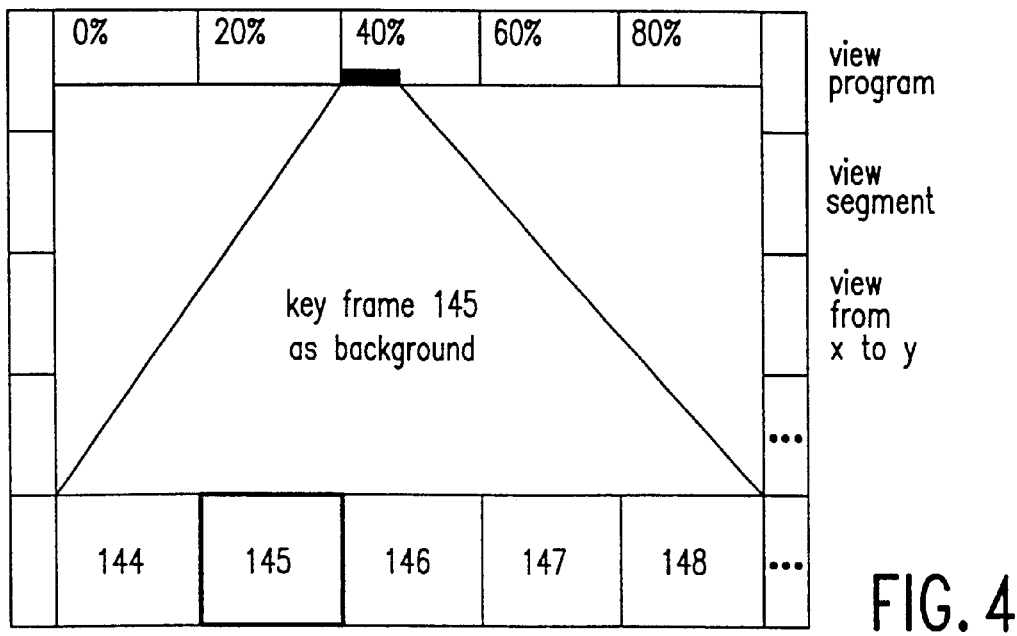
FIG. 3, a design of a scrolling mosaic user interface.
FIG. 4, a design of a scrolling list user interface.

FIG. 3 is shows a design of a scrolling mosaic user interface. Every screen presents 20 keyframes starting from top left to right down: each keyframe has its number in the overall ranking of keyframes shown. Actually, keyframe 144 is highlighted by a rectangular control cursor. A user person may activate a remote control to move the cursor freely over the keyframes displayed, as well as over the buttons displayed at the top and bottom bars through the navigational controls on the cursor device. If the user moves the control cursor to the left in the top left corner, the display jumps back by 20 keyframes. Moving to the right in the lower right hand corner will cause a forward jump over 20 frames. Accessing the top bar of the screen will control accessing other parts of the presentation, in that the latter is divided into five equally long parts: a black horizontal bar indicates the total time covered by the twenty keyframes displayed here, of the overall presentation.

Other functions are initiated by first selecting a particular keyframe and subsequently one of the bottom buttons. "View program" controls a start at a cursor-accessed keyframe. "View segment" does the same, but plays only a single segment, that will end at the next keyframe. "View from x to y" controls a start at the earliest in time of two cursor-accessed keyframes, and stops at the last in time of the two. Other modes are feasible together with the keyframe-selecting functionalities. Examples are fast-forward or slow-forward, that allow a user person to check a particular interval for certain occurrences, or fast/slow reverse to attain certain video effects. During display, upon passing the instant in time pertaining to a particular keyframe, the latter becomes active and effectively displays the video stream, until arriving at the instant associated with the next keyframe. Thereupon, the latter becomes the active frame. The above feature allows a user to straightforwardly program a video recorder for an interval display sequence such as by leaving out certain segments, such as advertising, or rather, to draw attention to certain details by means of slow-forward. During the display, audio may be active or suppressed through a control button not shown. Alternatively, control may let audio go one, whereas the video cursor is discrete, in that it steps only from interval to interval though appropriate highlighting.

FIG. 4 is an exemplary design of a scrolling list user interface. Here, at its bottom the overall screen has five keyframes displayed, keyframe 145 being highlighted by a rectangular control cursor that runs along its edges. Keyframe 145 is also displayed at a larger magnification in the background. The control interface is the same as in FIG. 3, although the button positions are different. Alternatively, the enlarged keyframe is suppressed in the multi-keyframe bar.

Figure 5:
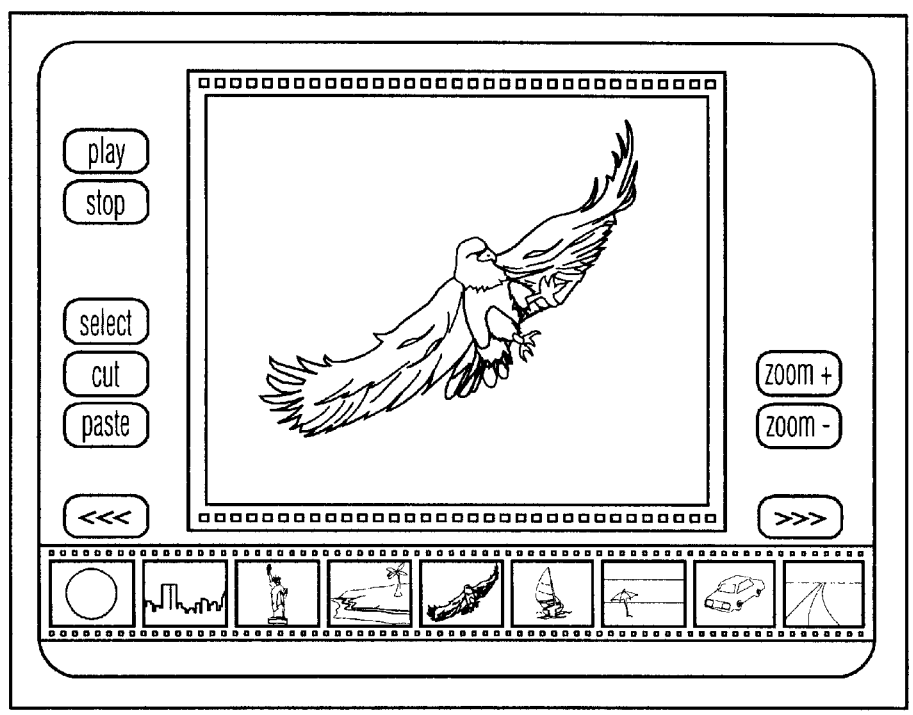
FIG. 5, a more extensive graphical user interface.

FIG. 5 shows a more extensive graphical user interface. First, left and right are columns of control buttons for play, stop, select, cut, paste, fast reverse, zoom+, zoom−, fast forward. The bottom row has a sequence of nine keyframes that pertain to respective different scenes or shots, in they have hardly any correlations therebetween. Through stepping in the hierarchical organization of the keyframes, a good overview on the scene-to-scene dynamics may be gathered. The inter-keyframe distance could be, for example, ten seconds, but greater and smaller spacings could be feasible. Especially with short distances between successive keyframes in time, features such as fast forward can be well realized. On the other hand, the same size of spacing could be used for full playback of all audio, whilst the video would only jump from one keyframe to the next. Now, the central keyframe is also represented in an enlarged manner. When playing closely spaced keyframes that have low enough granularity, the enlarged keyframe may be presented in a dynamic manner, for so effecting fast forward (or backward) mode. Upon reaching the material of the next keyframe, here showing a sailing vessel, the bottom row shifts one position to the left, so that the "sun" at left becomes obscured and a new keyframe enters from the right. Such display could in particular be at a faster frame rate than standard video, as mapped on the presentation from background storage medium. The reverse organization allows for fast reverse.

Figure 6:
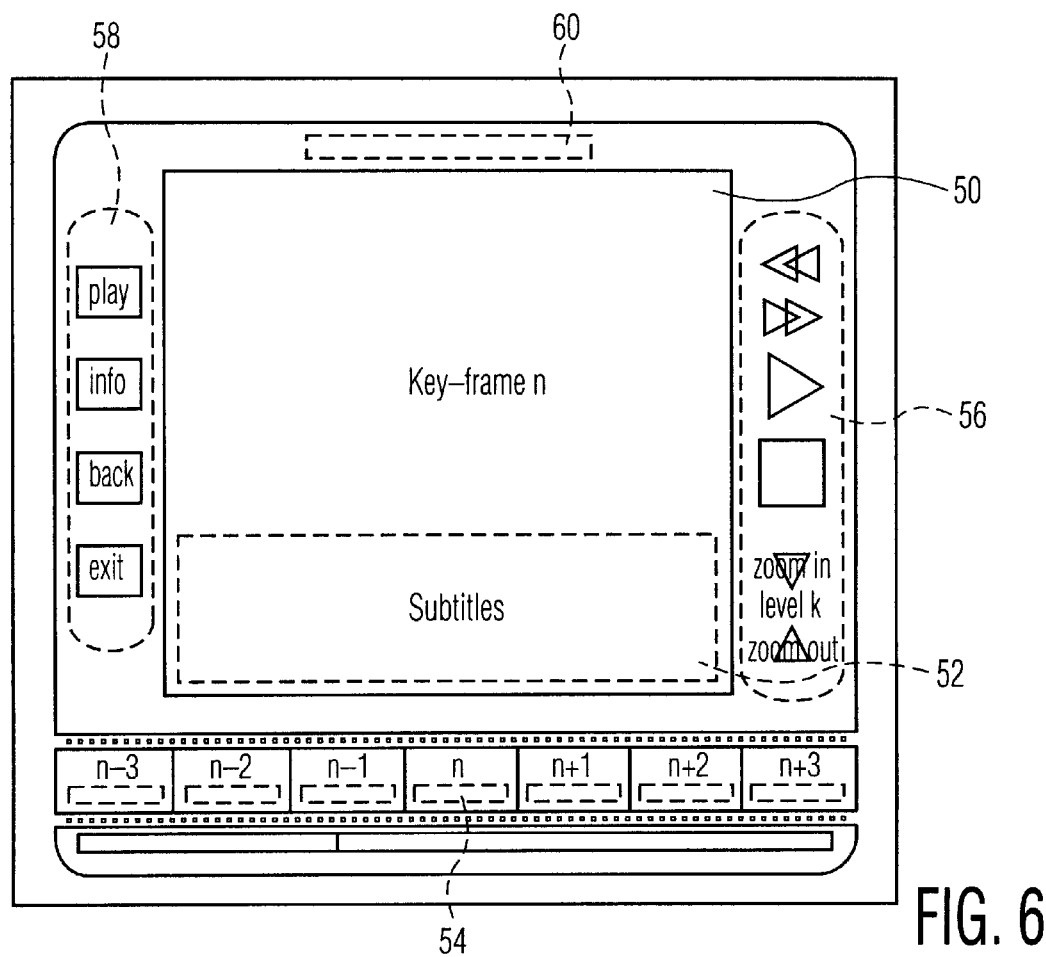
FIG. 6, the presentation of subtitles.

FIG. 6 shows the presentation of subtitles, in the general format as discussed with reference to FIG. 5. In the central field, space 50 has been devoted to the actual frame; space 52 has been devoted to displaying subtitles derived from, or associated to the video presentation, or to other relevant information, such as speech-to-text converted for the deaf, or a translation into another language than the one used for actual speech. It would not be necessary that the subtitles derive only from the range associated to the seven keyframes at the screen bottom. Their relevance could stretch much further. Further, each keyframe has a time code 54 or other relevant data overlayed thereon. The two columns of control buttons 56, 58 have been devoted to application operations at left, and intra-program operators at right. The top of the screen has the title 60 of the actual video program displayed.

The rationale of the arrangements for having a dynamic representation of the video cursor that runs in time in the actually active keyframe field, is that the static representation of the keyframes alone does less sufficiently convey the dynamics of the video representation as a whole, when such dynamics let the user better understand the evolving of the events. Therefore, the semantics are enhanced as follows. After the system has been idle for a certain amount of time, the keyframe that the cursor 'encloses' will 'come alive', because it will start playing the digital video material in miniature, including any associated audio and further effects. If during the playback, the next keyframe is reached, the cursor will automatically 'jump' to the next keyframe presented in the user interface, until the user will (re)start interacting with the system. In general, the organization described herein will allow browsing through information that is different and separate from the overall video string. Even if only the audio is played in a dynamic manner, whilst jumping from any keyframe to the next, the user gets a better impression of the underlying video, at particularly low storage requirements.

Figure 7:
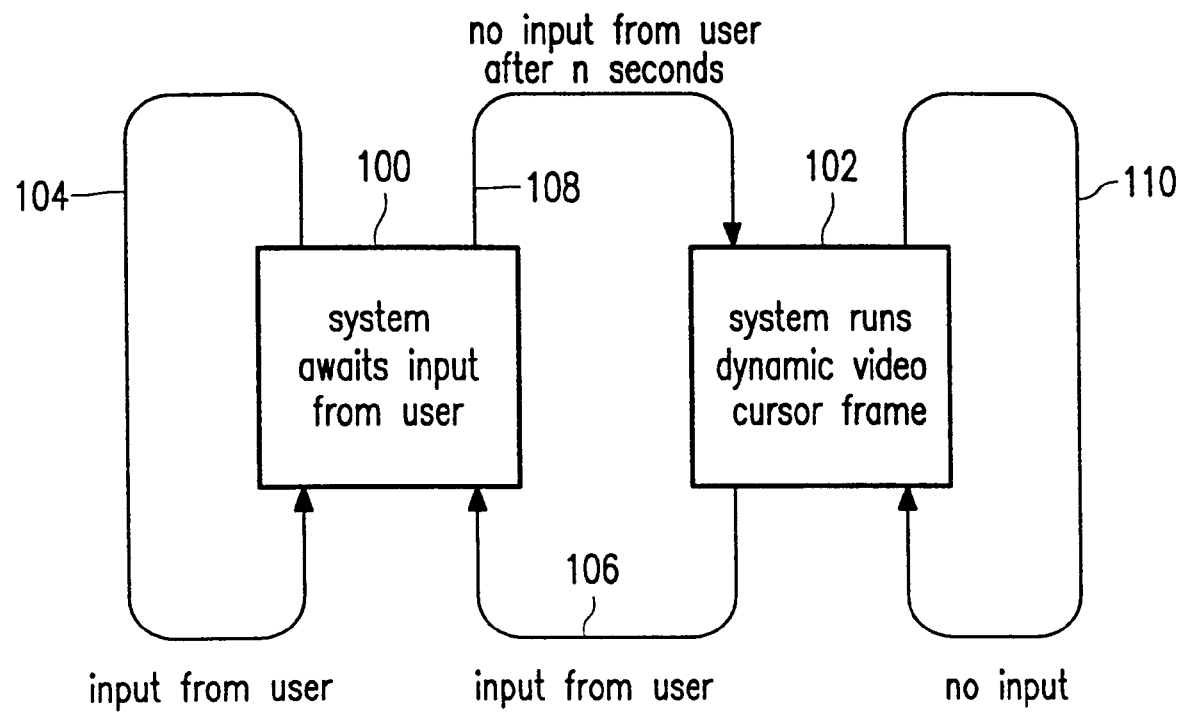
FIG. 7, a state diagram of the system operation.

In this respect, FIG. 7 is a state diagram of the system operation. In state 100, the system awaits input from the user, while displaying the multiple keyframes. Such input may imply jumping among the displayed keyframes, jumping to another set of keyframes, selecting a keyframe for displaying the associated interval. Any such input effects arrow 104 and starts a new time interval. Absent any such input during n seconds (such as 20 seconds), effects arrow 108, so that state 102 is reached. Therein, the system runs the dynamic video cursor frame. As long as no user input is received, arrow 110 is effected, and the system continues as long as displayable video material is available. If user input is received however, arrow 106 is effected, and the system freezes, either at the actual content of the dynamic video cursor frame, or at the beginning of the actual interval.

Detection and Filtering of Keyframes Affected By "Interlacing"Effect

Some of the keyframes used to browse the content of the video program, may have been extracted from a sequence with high motion. This produces an annoying zig-zag effect in case the video sequence was encoded with interlaced coding mode as normally is the case, a frame being made up of two fields which contribute to form the complete frame, where even lines belong to one field, odd lines to the other. This problem is more evident and annoying in small keyframes, where the effect is more visible, when the picture is magnified and the lines become thick blocks.

First, the keyframes affected by such an interlacing effect must be detected. This effect can be observed on the rows of the image and luminance variations cause high frequency values. This can be exploited by splitting the spatial frequency spectrum into many sub-bands and then considering only the high frequency components. Actually, the effect we want to detect must present alternating values of luminance between even and odd lines, therefore the highest sampling frequency of the resulting picture. The only coefficient that has to be computed is the highest frequency component of a frequency transformation (FFT or, better, DCT) on the columns. When the picture is affected by the zig-zag effect due to interlacing, this component will have a high value.

However, this effect will also be visible in correspondence of an object with motion, especially with components in the horizontal direction. Therefore we should not consider the total sum of the coefficients, as this would also yield high values in a picture with detailed and contrasted patterns and finally produce false positives. A better result can be obtained by splitting the image in several sub-parts, and considering the greatest value per area. For example, by summing the two highest values of each are, the overall sum will be less susceptible to highly detailed images.

Finally, as a lower vertical resolution is less annoying than the zig-zag effect, the simplest way of filtering this image is to consider only one field and then upsampling it vertically by a factor of 2. An interpolating filter, as mentioned in the following section, can be applied before showing the resulting picture.

So, the detection and correction are effected as follows. The first step is to discard one field by removing half of the rows, either even or odd; then, an upsampling by a factor of 2 is performed along the rows in order to recover the original size of the keyframe, followed by an interpolating filter. In this case, the filter performs a simple linear interpolation.

Upsampling and Interpolation

To be easily visible from a TV-viewing distance, the keyframe has to be enlarged at almost full screen size by means of an upsampling followed by an interpolating filter. Whereas generally the keyframe has a low resolution, it has to be enlarged by quite a high factor. This means that if it is further processed, the result would not be good-looking, as pixels become large blocks. Therefore the picture must be filtered, but a trade-off must be found since we need to generate a good quality picture to be shown at high resolution, but also fast processing for the application to have a short response time. The issue is that the enlargement must be performed on-the-flight on the picture, which means that the image cannot be enlarged and filtered just once, to be stored on the hard disk and re-used, because it would require too much storage space. Therefore the upsampling and filtering process must be as fast as possible while maintaining at the same time an acceptable result. Normally a usual interpolating filter may be employed (cf. any book on Digital Signal Processing; a relevant paper can be: H. C. Andrews, C. L. Patterson, Digital Interpolation of Discrete Images, IEEE Trans. Comput. 196, v25, pages 196–202).

Alternative techniques to improve the image quality can be used as well. Amongst them, wavelet-based solutions and fractals approaches seem to lead to a higher computational burden, but show outstanding results in visual quality. In fact, fractal compression techniques are well-known to be resolution independent: the details on a higher resolution can be reconstructed or simulated by applying the same decoding process iteratively. In this case what will be stored is a fractal compressed picture, yielding a high compression factor. Similarly, by using wavelets transformation, high frequency components on higher scales can be predicted to obtain a higher resolution image without blurring effects.

Textual Search on Video Programmes Based on Subtitles

In current video transmissions, subtitles are often transmitted along with the program (often in the Vertical Blanking Interval for analog systems or in a separate elementary stream in digital transmissions). This is normally used for programs distributed in foreign languages and not synchronized, or is meant for persons with hearing disability. Such information is normally superimposed on the screen, but could also be recorded on a storage medium. In this way, the speech of the program, and sometimes also some description of the sound for deaf people, is available for search operations.

The extraction of this kind of information should happen in real time, while the program is being recorded. If this technique is coupled to the keyframe extraction routines, we may link the picture to the related text, i.e. the dialogue that takes place in that part of the program from which the keyframe has been extracted. In this way, with current text retrieval techniques, we can perform text retrieval based on specific keywords. A specific tool of the application will offer the possibility to perform simple queries based on keywords and their composition, as now commonly used in "Web" search engines.

As an example, suppose a news program has been recorded. If we intend to retrieve news regarding France, when the word "France" is inserted, the system will automatically look for this word in the text of the program. If the result is positive, the user will be presented with the keyframe related to that part of the program and the specific part of subtitles where the keyword was found. The user can then start watching the program starting rom that particular point. If more keyframes are found as result of the query, they will be all shown on the bottom of the screen, as in FIG. 5, so that the user can analyze the related text one by one on the larger window. Of course similar keywords can be used (French, Paris) if the result was negative. This system can also be useful in sports programs to extract reports covering a specific team or sport.

Many other applications are feasible, for example to check whether a movie is to be allowed for children's viewing, by checking whether the words used in the dialogues are or not included in a list of "bad words.

Possible extension of such a system include:
extracting the text from the screen, such as by OCR techniques on still pictures, if the text is not available separately from the video
using speech recognition technology to extract the dialogues from the program. In this case the system will be always independent from the service offered by the broadcaster, so that even in case no subtitle is provided, text retrieval will always be possible at least on some specific keywords that the system can be trained to recognize.

What is claimed is:

1. A method for navigating through video matter by means of displaying one or more series of a plurality of keyframes in parallel, whilst allowing selective accessing of displayed keyframes for thereupon controlling actual access to said video matter as representing a mapping of so accessed keyframes, said method being characterized by allowing within a single user interface organization to select between a first operative mode for arranging keyframes in a temporally ordered manner on the screen and a second operative mode for arranging keyframes with multiple selectable granularities between contiguous keyframes as displayed, wherein the granularities range between coarse and fine granularity, and wherein a selectable course granularity represents a subset of a selectable fine granularity.

2. A method as claimed in claim 1, and whilst in said temporally ordered manner progressively playing back an audio interval associated to a temporally centered keyframe.

3. A method as claimed in claim 2, wherein successive audio intervals will constitute a substantially continuous audio representation with respect to a sequence of discretely spaced keyframes.

4. A method as claimed in claim 1, and in the second operative mode playing back an audio interval associated to an actually accessed keyframe.

5. A method as claimed in claim 1, characterized by highlighting a presently selected keyframe whilst simultaneously enlarging it at a multiple-sized format with respect to other keyframes, the method furthermore including detecting deleterious video interlacing effects and if so, reducing such effect by vertical decimation.

6. A method as claimed in claim 1, characterized by highlighting a presently selected keyframe whilst simultaneously enlarging it at a multiple format with respect to other keyframes, the method furthermore including applying an upsampling filter to the image before display.

7. A method as claimed in claim 1, whilst furthermore displaying associated to an actualized keyframe a subtitle or other relevant information extracted for an associated keyframe or sequence of keyframes.

8. A device being arranged for executing a method as claimed in claim 1.

9. The method of claim 1, wherein said keyframes are essentially complete keyframes.

10. The method of claim 1, comprising selecting said course granularity of keyframes from said fine granularity of keyframes.

11. A method for navigating through video matter by means of displaying one or more series of a plurality of keyframes in parallel, while allowing selective accessing of displayed keyframes for thereupon controlling actual access to said video matter as representing a mapping of so accessed keyframes, said method comprising allowing within a single user interface organization to select between a first operative mode for arranging a first group of keyframes in a temporally ordered manner on the screen and a second operative mode for arranging a second group of keyframes selectable from the first group of keyframes, wherein the second group of keyframes is a subset of the first group of keyframes.

12. The method of claim 11, comprising selecting said course granularity of keyframes from said fine granularity of keyframes.

13. A method for navigating through video matter, said method comprising:
storing a first group of keyframes related to said video matter; and
selecting a second group of keyframes from said first group of keyframes, wherein the granularity between the keyframes of said first group of keyframes is a fine granularity, wherein the granualarity between the keyframes of said second group of keyframes is a coarse granularity, and wherein the course granularity represents a subset of the fine granulity.

14. The method of claim 13 comprising providing within a single user interface organization to select between a first operative mode for arranging said first group of keyframes and a second operative mode for arranging said second group of keyframes.

* * * * *